Patented Jan. 12, 1937

2,067,748

UNITED STATES PATENT OFFICE 2,067,748

METHOD OF MAKING SOLUBLE SALTS AND PRODUCTS THEREOF

Fritz Zimmermann, Newark, N. J., assignor to Baker & Company, Inc., Newark, N. J., a corporation of New Jersey No Drawing. Application January 9, 1935, Serial No. 953. In Great Britain May 12, 1934

17 Claims. (Cl. 23—14)

This invention relates to new rhodium compounds and methods of preparing the same.

The object of my invention is to provide new rhodium compounds which are soluble in water. I have found that if rhodium alkali nitrite compounds are heated in water they undergo changes and new compounds are found. Insoluble alkali rhodium nitrite compounds are made soluble by this treatment but my invention is not restricted thereto as the invention is also applicable to soluble alkali rhodium nitrite compounds.

The insoluble alkali rhodium compounds will be first considered. Rhodium ammonium nitrite as described in the literature has a formula $(NH_4)_3Rh(NO_2)_6$. From my work I believe that this salt contains sodium and that the actual composition of this insoluble salt is $Na(NH_4)_2Rh(NO_2)_6$. This rhodium ammonium nitrite is very insoluble and is used for quantitative precipitation of rhodium, and for separating rhodium from other metals. I have found that if I boil this compound in water for a certain length of time, it will go in solution and stay in solution, and by adding more of the insoluble compound to the aqueous solution formed, I can dissolve more of the compound and make it stay in solution. While heating in water a decomposition takes place and nitrous gases are given off and can be observed during the heating. The same method may be applied to soluble alkali rhodium nitrite compounds such as sodium rhodium nitrite, and a decomposition also takes place to give new rhodium compounds having less $NO_2$ in proportion to the rhodium than the original starting product. The new rhodium compounds may be defined as containing no other acid radicals than the oxides of nitrogen, the $NO_2$ content in proportion to the rhodium being less than the $NO_2$ content of the undecomposed alkali rhodium nitrite compounds. The treated rhodium ammonium nitrite compound contains $NH_4$ and $NO_2$ groups but in smaller amounts in proportion to the rhodium than present in the untreated rhodium ammonium nitrite.

One method of practising my invention is as follows: Take 25 grams of rhodium ammonium nitrite and suspend the same in 100 cc. of distilled water. The mixture is then heated under a reflux condenser and all the 25 grams of salt will go into solution. The mixture is boiled for about 10 to 30 hours, and during this time solution takes place. The resulting solution has an acid reaction. During the act of dissolving, brown fumes are given off, indicating that a partial decomposition takes place and that some of the nitrogen and oxygen are released from the molecule. I believe that these brown fumes are $NO_2$. The reflux condenser is used in order to prevent the solution from evaporating to dryness. It is open to the atmosphere to permit the escape of any gaseous products. The boiling and dissolving steps are carried on in the presence of these brown fumes, which may form acids with the water present. I have found that the presence of H-ions is desirable, as they act as a catalyzer and hasten the solution of the rhodium ammonium nitrite in water. The heating may be performed in an open vessel, but the heating must be prolonged when a reflux condenser is not used.

The solution obtained from boiling the rhodium ammonium nitrite with water as above described, is transferred into a volumetric flask and filled up to 250 cc. Samples of 10 cc. each of this solution correspond to 1 gram of original rhodium ammonium nitrite. By evaporating one of these samples to dryness, until constant weight is obtained, I found that the dry product weighs about 785 milligrams. From this it will be apparent that starting with 1 gram of the insoluble salt I now have left 78½% of the original weight, and the difference, therefore, must have escaped as gaseous products. Toward the end of the evaporating step a gelatinous product is obtained. Further evaporation is necessary to obtain the dry product. The dry product is very hygroscopic and tends to go back to the gelatinous form when allowed to stand in the air. The dry product is easily soluble in 1 cc. of water. It will be seen, therefore, that I have changed a material which was practically insoluble in water, into one of extreme solubility, since 100 grams are easily soluble in 100 cc. of water.

One sample corresponding to 1 gram of original salt which had been dissolved in water by boiling under a reflux condenser and evaporated in a porcelain crucible was easily soluble in water. When the solution was brought up to 100 cc. it showed a pH of approximately 3.

The soluble material contained in the water solution is an electrolyte, and on passing an electric current through the same, yields a deposit of rhodium. When using this electrolyte as a bath, a voltage of about 6 volts with ½ ampere is used. The effective anode and cathode surfaces are about 6 square inches, and the distance between the two electrodes is about 1½ inches.

About 2 grams of rhodium per liter of electroplating solution are used.

A solution of 500 cc. prepared in the manner described was made slightly ammoniacal. This ammoniacal solution was plated with a current density of about 10 amperes per square foot at 4 volts at a temperature of about 30 to 60° C. A good plate was obtained. Furthermore, my new rhodium salt in solution may be neutralized and a neutral electrolyte obtained, which may be used for electroplating rhodium.

The electrolytes above described are especially adapted for tarnish proofing the cheaper metals which tarnish when exposed to atmospheric conditions. When rhodium is deposited out of my electrolytes on articles, a silver white deposit is obtained.

Another method of preparing my new compounds is to use more water than is given in the above example and it is found that quicker solution is obtained. Take 40 grams of rhodium ammonium nitrite and suspend the same in about 1000 cc. of distilled water. This mixture is heated under a reflux condenser and in about 6 hours' time the insoluble salt is completely dissolved.

A comparison will now be made between the insoluble rhodium sodium ammonium nitrite and my water soluble compound.

The composition of the starting product $[(NH_4)_2NaRh(NO_2)_6]$ is:

| | Percent |
|---|---|
| Rh | 23.50 |
| Na | 5.25 |
| $NH_4$ | 8.22 |
| $N_2$ | 25.58 |

An analysis of the new salt made after heating with water shows approximately the following composition:

| | Percent |
|---|---|
| Rh | 29.90 to 30.04 |
| Na | 6.60 to 7.09 |
| $NH_4$ | 5.62 to 5.75 |
| $N_2$ | 19.04 to 20.07 |

This corresponds to about the following formula:

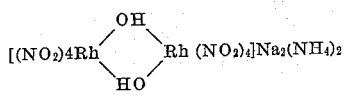

which has the theoretical composition:

| | Percent |
|---|---|
| Rh | 29.83 |
| Na | 6.67 |
| $NH_4$ | 5.23 |
| $N_2$ | 20.30 |

While I believe that my new rhodium ammonium nitrite compound has the above formula, I do not wish to restrict myself to this formula.

My invention is also applicable to the other alkali rhodium nitrites and the water soluble sodium rhodium nitrite and the water insoluble potassium rhodium nitrite may be treated to form new compounds having less $NO_2$ in proportion to the rhodium than their parent substances. By boiling sodium rhodium nitrite or potassium rhodium nitrite in water under a reflux condenser nitrous gases are given off and a soluble salt is formed somewhat similar to the ammonium rhodium salt. Naturally with these two alkali rhodium nitrites there is not the reaction which most likely takes place with the ammonium rhodium nitrite in which some of the ammonium will react with some of the $NO_2$, forming nitrogen and water. When the alkali metal rhodium nitrites are boiled with water on the reflux condenser, the escape of dark colored nitrogen oxides can be clearly seen and some of the nitrite groups are released. The resulting salts are extremely soluble in water and are also soluble in alcohol.

The untreated alkali metal rhodium nitrites are practically insoluble in alcohol, whereas, the treated alkali rhodium nitrites are soluble in alcohol. The ammonium rhodium nitrite made soluble according to my invention is easily soluble in 90% alcohol and under slight heating is soluble in 95% alcohol. 100 mgs. each of the treated soluble ammonium rhodium nitrite compound showed 95% solubility in 30 cc. of 90% alcohol on standing cold and 100% solubility on heating to 50–60° C. in 95% alcohol. The untreated water soluble sodium rhodium nitrite is practically insoluble in pure alcohol and only partly soluble in dilute alcohol. 100 mgs. each of the untreated water soluble sodium rhodium nitrite were put under 30 cc. each of 90 and 95% alcohol. The fraction soluble in 90% alcohol amounted to about 5%. The fraction soluble in 95% alcohol amounted to about 1%.

The soluble ammonium rhodium nitrite compound made according to my invention is also soluble in concentrated solutions of ammonium chloride, potassium acetate, potassium nitrite and potassium chloride. The treated soluble rhodium ammonium nitrite compound is a yellowish powder which is very hygroscopic. It is extremely soluble in water. The alcoholic solution can be evaporated to dryness and the salt does not metallize, as most alcoholic solutions of platinum metals do, but stays soluble in alcohol and in water.

The treated potassium rhodium nitrite salt is soluble in alcohol as follows:

100 mgs. treated with 30 cc. of 50% alcohol showed a solubility of 99%.
100 mgs. treated with 30 cc. of 75% alcohol showed a solubility of 94%.

These tests were made on standing cold.

The water insoluble ammonium rhodium nitrite is insoluble in concentrated solutions of ammonium or potassium chloride, ammonium or potassium acetate and sodium nitrite. Potassium rhodium nitrite is completely insoluble in concentrated solutions of potassium nitrite, potassium chloride, and potassium acetate. In contradistinction the new salts are completely soluble in all the above mentioned solvents.

As above pointed out the ammonium rhodium nitrite is believed to contain sodium. In order to show that my invention is applicable to all the alkali rhodium nitrites, true ammonium rhodium nitrite containing no sodium was prepared. This salt was prepared by treating a rhodium chloride of known chlorine content with the exact proportion of analyzed silver nitrite to form silver chloride and rhodium nitrite. The precipitated silver chloride was filtered off and the filtrate or solution was treated with pure ammonium nitrite resulting in the precipitation of rhodium ammonium nitrite free of sodium. This compound was also converted to soluble form by treatment with water as above set forth. The treated compound is also soluble in alcohol and in the salt solutions above given.

The water solutions of the treated sodium rhodium nitrite and of the potassium rhodium nitrate, are good electrolytes for depositing rhodium. Also the solutions may be made alkaline or ammonical and good plating solutions obtained. However, the treated ammonium rhodium nitrite is preferred.

This application is filed as a continuation in part of my application for Method of making soluble salts and products thereof, Serial Number 563,887, filed September 19, 1931.

What I claim is:

1. A water soluble complex of rhodium and nitrite united with ammonium and containing no other acid radicals than the oxides of nitrogen, the nitrite content in proportion to the rhodium being less than the nitrite content of ammonium rhodium nitrite or ammonium sodium rhodium nitrite.

2. A water and alcohol soluble complex of rhodium and nitrite united with an alkali and containing no other acid radicals than the oxides of nitrogen, the nitrite content in proportion to the rhodium being less than the nitrite content in an alkali rhodium nitrite.

3. A water soluble complex of rhodium and nitrite united with ammonium and having a smaller number of nitrite groups in proportion to the rhodium than ammonium rhodium nitrite or ammonium sodium rhodium nitrite and containing only acid radicals of nitrogen, the amount of nitrogen in proportion to the rhodium being less than the amount of nitrogen in ammonium rhodium nitrite or ammonium sodium rhodium nitrite.

4. A water soluble complex of rhodium and nitrite united with ammonium and containing a smaller number of nitrite groups in proportion to the rhodium than ammonium rhodium nitrite.

5. A water and alcohol soluble complex of rhodium and nitrite united with an alkali and containing a smaller number of nitrite groups in proportion to the rhodium than an alkali rhodium nitrite.

6. A method of preparing water soluble rhodium compounds which comprises suspending ammonium rhodium nitrite or ammonium sodium rhodium nitrite in a liquid menstruum consisting of water, and then heating the same until complete solution is obtained.

7. A method of preparing water soluble rhodium compounds which comprises boiling a suspension of ammonium rhodium nitrite or ammonium sodium rhodium nitrite in a liquid menstruum consisting essentially of water until complete solution is obtained.

8. A method of preparing water soluble rhodium compounds which comprises boiling a suspension of ammonium rhodium nitrite or ammonium sodium rhodium nitrite in water under a reflux condenser until the insoluble rhodium compound has gone into solution.

9. A method of making new rhodium compounds which comprises heating an alkali rhodium nitrite in a liquid menstruum consisting essentially of water and continuing the heating until a part of the nitrite has been removed.

10. A method of preparing soluble rhodium compounds which comprises boiling a suspension of an insoluble alkali rhodium nitrite in a liquid menstruum consisting essentially of water until a clear solution is obtained.

11. A method of preparing soluble rhodium compounds which comprises heating a suspension of ammonium rhodium nitrite or ammonium sodium rhodium nitrite in water for about 10 hours until a water soluble rhodium ammonium nitrite compound is formed.

12. A water soluble ammonium sodium rhodium nitrite compound having approximately the following formula:

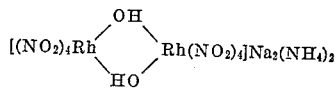

13. A water and alcohol soluble complex of rhodium and nitrite united with sodium and containing a smaller number of nitrite groups in proportion to the rhodium than sodium rhodium nitrite.

14. A water soluble complex of rhodium and nitrite united with potassium and containing a smaller number of nitrite groups in proportion to the rhodium than potassium rhodium nitrite.

15. A complex of rhodium and nitrite united with ammonium which is hygroscopic when dry and which is soluble in 95% alcohol.

16. A complex of rhodium and nitrite united with ammonium, soluble in 95% alcohol and containing a smaller number of nitrite groups in proportion to the rhodium than ammonium rhodium nitrite.

17. A complex of rhodium and nitrite united with an alkali, extremely soluble in alcohol and containing a smaller number of nitrite groups in proportion to the rhodium than an alkali rhorium nitrite.

FRITZ ZIMMERMANN.